(12) United States Patent
Hansen et al.

(10) Patent No.: US 11,689,540 B2
(45) Date of Patent: Jun. 27, 2023

(54) DEVICE FOR A SECURE DATA CONNECTION OF AT LEAST ONE MANUFACTURING MACHINE

(71) Applicant: ROMMELAG ILABS GMBH, Sulzbach/Laufen (DE)

(72) Inventors: Gert Hansen, Gaggenau (DE); Helmut Jacob, Ettlingen (DE)

(73) Assignee: ROMMELAG ILABS GMBH, Sulzbach/Laufen (DE)

( * ) Notice: Subject to any disclaimer, the term of this patent is extended or adjusted under 35 U.S.C. 154(b) by 296 days.

(21) Appl. No.: 17/270,145

(22) PCT Filed: Aug. 27, 2019

(86) PCT No.: PCT/EP2019/072750
§ 371 (c)(1),
(2) Date: Feb. 22, 2021

(87) PCT Pub. No.: WO2020/048815
PCT Pub. Date: Mar. 12, 2020

(65) Prior Publication Data
US 2021/0185052 A1 Jun. 17, 2021

(30) Foreign Application Priority Data
Sep. 5, 2018 (DE) ..................... 10 2018 007 004.3

(51) Int. Cl.
*H04L 29/06* (2006.01)
*G05B 19/42* (2006.01)
*G05B 19/418* (2006.01)
*H04L 9/40* (2022.01)
*G05B 19/042* (2006.01)

(52) U.S. Cl.
CPC ........ *H04L 63/105* (2013.01); *G05B 19/0425* (2013.01); *G05B 19/4185* (2013.01); *H04L 63/0209* (2013.01)

(58) Field of Classification Search
CPC ... H04L 63/105; H04L 63/0209; G06F 21/85; G05B 19/0425; G05B 19/4185; Y02P 90/02
(Continued)

(56) References Cited

U.S. PATENT DOCUMENTS

| 6,502,997 | B1 | 1/2003 | Lee et al. |
| 2002/0052715 | A1* | 5/2002 | Maki ................ G05B 19/41855 |
| | | | 702/184 |

(Continued)

FOREIGN PATENT DOCUMENTS

| DE | 10 2017 124 821 | 5/2018 |
| EP | 2 193 470 | 11/2017 |

OTHER PUBLICATIONS

Control system segmentation, White et al., Jun. 2001 (Year: 2001).*
(Continued)

*Primary Examiner* — Jahangir Kabir
(74) *Attorney, Agent, or Firm* — Wenderoth, Lind & Ponack, L.L.P.

(57) ABSTRACT

A device for a secure data connection of at least one manufacturing machine (104) has an information-processing system (114), which is subdivided into individual zones (108, 110, 112) interconnected by data diodes (120) such that data originating from the machine control (118) of the manufacturing machine (104) in a data flow can be transferred to other zones (108, 110, 112) without the possibility of a data return flow. The individual zones (110, 112) are ordered hierarchically. Each individual zone has a lower level of data security than the upstream individual zone (108, 110) in relation to the data flow. Every individual zone (108, 110, 112) is formed as an independent computer in the (Continued)

manner of an isolated application. In addition, a manufacturing machine and a production plant includes the device for secure data connection.

17 Claims, 3 Drawing Sheets

(58) Field of Classification Search
USPC .......................................................... 726/26
See application file for complete search history.

(56) References Cited

U.S. PATENT DOCUMENTS

| | | |
|---|---|---|
| 2002/0112181 A1 | 8/2002 | Smith |
| 2007/0233728 A1* | 10/2007 | Puteick .................. G06Q 10/06 |
| 2015/0106912 A1 | 4/2015 | Brandon et al. |
| 2017/0052830 A1* | 2/2017 | Gambardella ...... G06F 11/0793 |
| 2018/0115516 A1 | 4/2018 | Rotvoid et al. |

OTHER PUBLICATIONS

International Search Report (ISR) dated Nov. 20, 2019 in International (PCT) Application No. PCT/EP2019/072750.

Chapter 7: Establishing Secure Enclaves; Chapter 8: Exception, Anomaly, and Threat Detection; Chapter 9: Monitoring Enclaves ED—Eric D Knapp, Industrial Network Security. Securing Critical Infrastructure Networks for Smart Grid, SCADA, and Other Indurstial Control Systems, Syngress, pp. 147-247, ISBN: 978-1-59749-645-2. XP002687973, Jan. 1, 2011, cited in ISR.

\* cited by examiner

DEVICE FOR A SECURE DATA CONNECTION OF AT LEAST ONE MANUFACTURING MACHINE

BACKGROUND OF THE INVENTION

In production companies, manufacturing machines are regularly integrated into an operational process based on the "automation pyramid" known from the state of the art, which is subdivided into different levels and which permits information to be transferred only in the vertical direction of its levels. Any information exchanged with external service providers happens via the highest level of the pyramid, i.e. at the enterprise resource planning (ERP) level. As a part of "Industry 4.0", however, a direct connection of manufacturing machines to external data processing devices, such as computers of a cloud (cloud computing) or, with regard to the company operating the machine, to computers of other companies, is increasingly desired at the individual levels of the automation pyramid in the horizontal direction, without including further levels of the pyramid. However, in the case of such a direct connection of a manufacturing machine to an external data processing facility, means must be provided to protect the manufacturing machine from access by third parties.

From U.S. Patent Application Publication No. 2015/0106912 A1, a device for a secure data connection of at least one manufacturing machine to an external (with respect to the manufacturing machine and with respect to the company operating the manufacturing machine) data server is known. The external data server has a controller formed as an integral component of the manufacturing machine. On the controller software for data processing of the machine data of the manufacturing machine, in particular for buffering, forwarding and/or compression, is implemented in the controller that is connected via an external (with respect to the manufacturing machine) firewall to a machine network. In the machine network, a plurality of manufacturing machines are provided. The machine network, via a further external (with respect to the relevant manufacturing machine) firewall, is connected to the external data server, which is connected to the Internet.

Access control to the controller of the manufacturing machine, for the remote servicing for troubleshooting by an expert via the Internet, in one exemplary embodiment, is implemented by an encryption and in a further exemplary embodiment by an upload of the machine data from the controller, without any data backflow, solely in the direction of the expert's company-external computer. The upload of data denotes the transfer of data from a local computer or storage medium to a computer or storage medium remote from the local computer or storage medium.

An alteration affecting the machine control, such as a write access to the controller of the manufacturing machine, originates from an external (with respect to the manufacturing machine and/or to the company operating the machine) computer. The alteration, having adverse effects on the product manufactured by the machine, cannot be completely ruled out by the known solution, e.g. because of a security gap, a software or hardware error (Spectre and Meltdown) and/or a flawed configuration of the firewalls.

SUMMARY OF THE INVENTION

Starting from this prior art, the invention addresses the problem of further improving the known solution such that the operational safety of the manufacturing machine is increased.

This problem is basically solved by a device for a secure data connection of at least one manufacturing machine, according to the invention, having a system that is subdivided into individual zones interconnected by data diodes such that data originating from the machine control of the manufacturing machine in a data flow can be transferred to other zones without the possibility of data backflowing. The zones, ordered hierarchically, each have a lower level of data security than the upstream zone with respect to the data flow. Every zone is formed as an independent computer in the manner of an isolated application.

The design of every zone in the manner of an island solution as an independent computer is defined as every computer being independently functional with regard to its hardware and software and being formed to be separate from the other computers at the hardware and software level, in particular spaced apart.

The information processing system is divided into zones, each of which is formed as an independently functioning computer in terms of software and hardware. By separating the zones at the software and hardware levels, an extremely effective access control can be set up in terms of security for read and/or write access of external (with regard to the manufacturing machine) data processing devices to the data originating from the machine control of the manufacturing machine.

In concrete terms, different zones of the information processing system having different levels of data security, i.e. data criticality, can be defined, which can be used to grant access rights in the form of either read and write access or read-only access to an individual external (with respect to the manufacturing machine) data processing device, in accordance with the data security of the individual zone connected to the data processing device. Thus, in the case of access of a data processing device to the zone having the highest level of data security, the data originating from the machine control of the manufacturing machine can be both changed in the sense of a write access and readable, and in the case of access to a zone having lower level of data security in relation to this zone, because of data transmission without any data return flow. Unidirectional data transmission, from the zone having the highest level of data security in the direction of the zone having lower level of data security in relation thereto, the data can be read only and cannot be changed in the sense of a write access, i.e. is immutable by means of a write access.

As a result, a respective zone, subordinate to the zone having the highest level of data security and having a lower level of data security in relation to the zone having the highest level of data security, can be connected to an external data processing device without the possibility of write access to the data of the zone having the highest level of data security, originating from the machine control of the manufacturing machine. This increases the operational reliability of the manufacturing machine.

In a preferred exemplary embodiment, the first zone downstream of the machine control can, as the production zone, process at least machine data of the manufacturing machine and forward them to a monitoring zone and/or a service zone as the respective downstream zone. The machine data can be forwarded to an company-internal or external network, such as the Internet. In this case, the respective network is formed as an company-internal or a (company-)external network, with regard to the company operating the manufacturing machine.

By data transmission can the production zone of the one machine control be connected to machine controls of other manufacturing machines within a production plant.

The production zone permits at least one of the data processing operations listed below: Data processing of data of the manufacturing execution system (MES) of a manufacturing management system and/or data processing of data collected over a period of time, and/or generation of production logs and/or reports. The MES is a process-related level of a manufacturing management system or production control system that can be represented schematically by the automation pyramid known from the state of the art. Here, the production management system or production control system is based on the product produced by the manufacturing machine.

The monitoring zone may permit at least one of the data processing operations listed below: Generating a data overview of a manufacturing machine, and/or detecting trends, and/or recording the operating state of the machine.

The service zone may permit at least one of the data processing operations listed below: Data processing of maintenance data, and/or recording the machine operating state, and/or performing remote diagnostics.

Data transmission between the individual manufacturing machines of a production plant can at least permit the transmission of the data listed below: Data of the Manufacturing Execution System (MES) of the manufacturing management system, and/or data collected over a period of time.

The company-internal network may at least permit the transmission of the data listed below: Data to generate an overview of multiple manufacturing machines, and/or data of mobile devices.

The external network can, preferably involving the cloud, at least permits the transmission of data for maintenance scheduling, and/or a creation of directories and/or documentation records and/or a link between real machine data and documentation in the cloud. This applies in particular to services offered by the machine manufacturer. Further applications are, e.g., machine monitoring or predictive maintenance.

The respective data diode used between the individual zones having their computer units can be formed by a laser diode, which is used for light generation, and a photo diode, which is used for light detection of the generated light.

The zones, at least partially interconnected in parallel, can be connected in series with the first zone with respect to the data flow, and/or can be at least partially connected in series, starting from the first zone.

Every zone can comprise on the input end at least one protocol converter for protocol conversion and coupling of a data transfer protocol that can be transmitted by the data diodes to a data transfer protocol that can be processed by the zones and/or can comprise on the output end at least one further protocol converter for protocol conversion and coupling of a data transfer protocol that can be processed by the zones to a data transfer protocol that can be transmitted by means of the data diodes.

The computers can be formed identically, in particular with regard to their hardware and/or operating software, and can be configured for their intended use, in particular by application software, in accordance with the individual zone.

A data diode may be formed by a transmitting unit, which is part of a respective zone, and a receiver unit, which is part of a zone having a lower level of data security in relation to that zone. A data transmission means is used to interconnect the transmitting unit and the receiver unit.

The transmitting unit may be formed as a transmitting data diode comprising a laser diode and, in particular, a multiplexer and a modulator. The receiver unit may be formed as a receiving data diode comprising a photo diode and, in particular, a demodulator and a demultiplexer. The transmitting unit and the receiver unit are interconnected via the data transmission means in the form of an optical fiber cable.

The subject matter of the invention is also a manufacturing machine having, as an integral part thereof, a device as described above. The solution according to the invention is particularly suitable for use in blow molding, filling and sealing machines. These machines are regularly used in the chemical-pharmaceutical and food industries.

The subject matter of the invention is also a production plant comprising a plurality of manufacturing machines as described above.

The device according to the invention can be used to particular advantage in companies in which a manufacturing machine must meet above-average safety requirements due to mandatory official regulations.

In such a case, for any change affecting the machine, a producer operating the manufacturing machine has to demonstrate that a particular change affecting the machine will not have any adverse effects on the product produced by the machine. Such a change can be, for instance, a connection of the machine to an external data processing device or an installation of an application software on the controller, i.e. the industrial control system, of the machine.

In addition, on the basis of the regulatory requirements, the software services running on the controller of the machine, i.e. the various types of application software, depending on whether they relate to components and processes of the machine that have to be validated or are validated or do not have to be validated, are classified as Good Manufacturing Practice (GMP), Relevant software services subject to regulatory requirements or as non-GMP-relevant software services sre hardly subject to regulatory requirements. Write access by non-GMP-relevant software services to validated components or processes of the machine must be precluded mandatorily.

Therefore, in such "regulated companies", after any such alteration, the components and processes of the machine affected by these changes have to be validated based on test procedures and risk assessments, which is time-consuming and costly. However, even such test procedures or risk assessments cannot completely rule out adverse effects on the product manufactured by the machine because of access to the controller of the manufacturing machine from an external (with regard to the manufacturing machine) data processing device or because of newly installed application software.

Based on the design of the device according to the invention, validation processes in the form of risk assessments and/or test procedures are at least partially eliminated, because the zone subordinate to the zone having the highest level of data security and having a lower level of data security in relation to it, can be connected to an external data processing device, without the possibility of write access to the data, originating from the machine control of the manufacturing machine, of the zone having the highest level of data security, and because the GMP-relevant application software can run in a zone having a higher level of data security and the non-GMP-relevant application software can run in a zone having a lower level of data security.

As a result, when the device according to the invention is used in combination with a manufacturing machine subject to official regulations, modifications affecting the manufacturing machine can be performed simply and inexpensively, in particular with regard to the connection of the manufacturing machine to external data processing equipment and/or the implementation of application software for the manufacturing machine, while complying with the relevant official safety requirements.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure and that are not to scale.

DETAILED DESCRIPTION OF THE INVENTION

Figure 1:
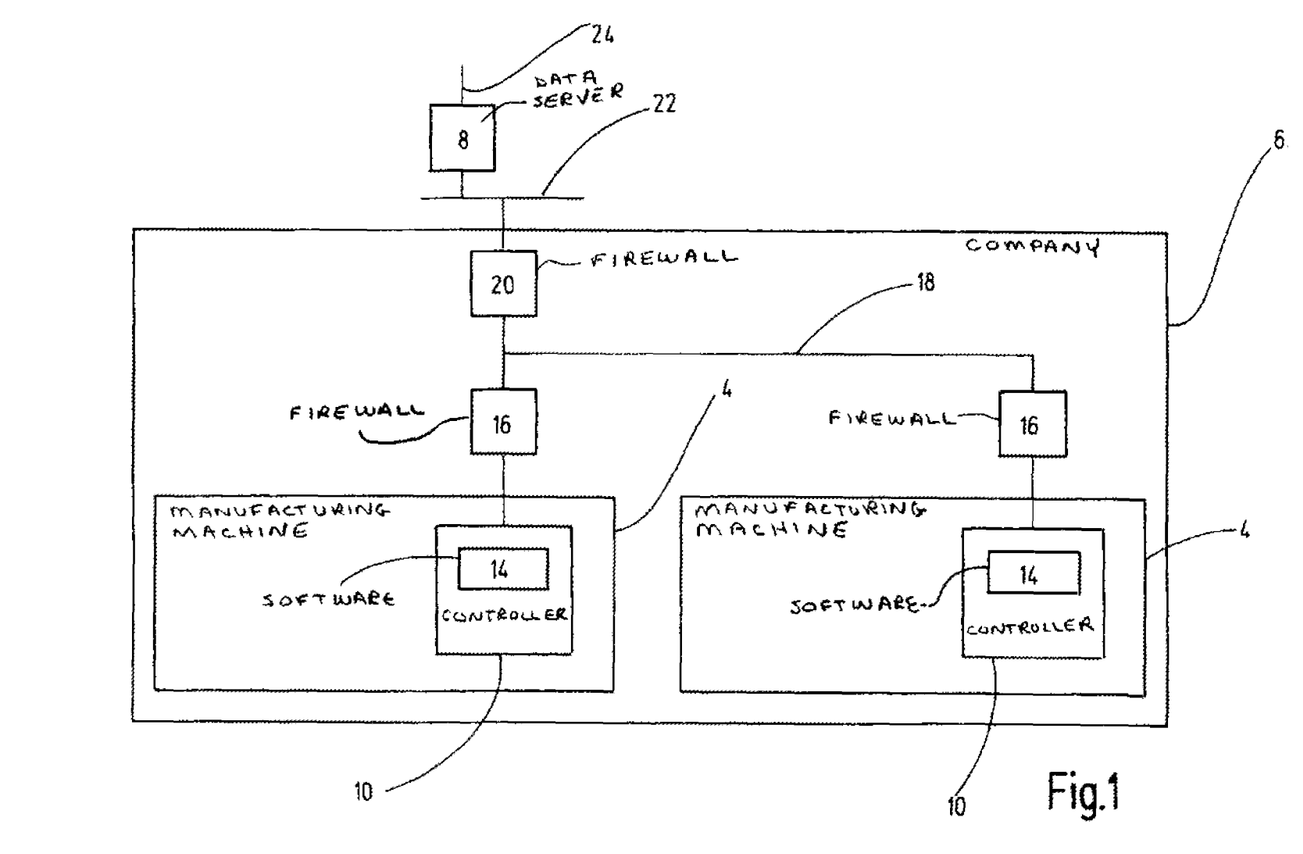
FIG. 1 is a schematic block diagram of a device for the secure data connection of at least one manufacturing machine, known from the prior art.

FIG. 1 shows a schematic block diagram of the device, known from the prior art (US 2015/0106912 A1), for connecting at least one manufacturing machine 4 to an external (with regard to the manufacturing machine 4 and with regard to the company 6 operating the manufacturing machine 4) data processing device in the form of a data server 8. The device comprises a controller 10, i.e., the controller of the machine, which is formed as an integral part of the manufacturing machine 4 and on which software 14 for data processing of the machine data of the manufacturing machine 4, in particular for buffering, forwarding and/or compressing. The controller is implemented and is connected to an company-internal machine network 18 via a firewall 16. Firewall 16 is external with respect to the manufacturing machine 4 and to company-internal with respect to the company operating the manufacturing machine. In the company-internal machine network 18, a plurality of manufacturing machines 4 are provided. The company-internal machine network 18 is connected to the company-external data server 8 via a further company-internal firewall 20 and via a company-external network 22. The network 22 can be connected to a remote service not shown in the figures by the Internet 24. In the context of a remote service, an expert working remotely from the company operating the manufacturing machine troubleshoots the manufacturing machine by a computer via the Internet 24.

Access control to the controller 10 of the manufacturing machine 4 for performing the remote service is implemented by encrypting or uploading the machine data from the controller 10 solely towards the company-external computer of the expert, without any data backflow.

Figure 2:
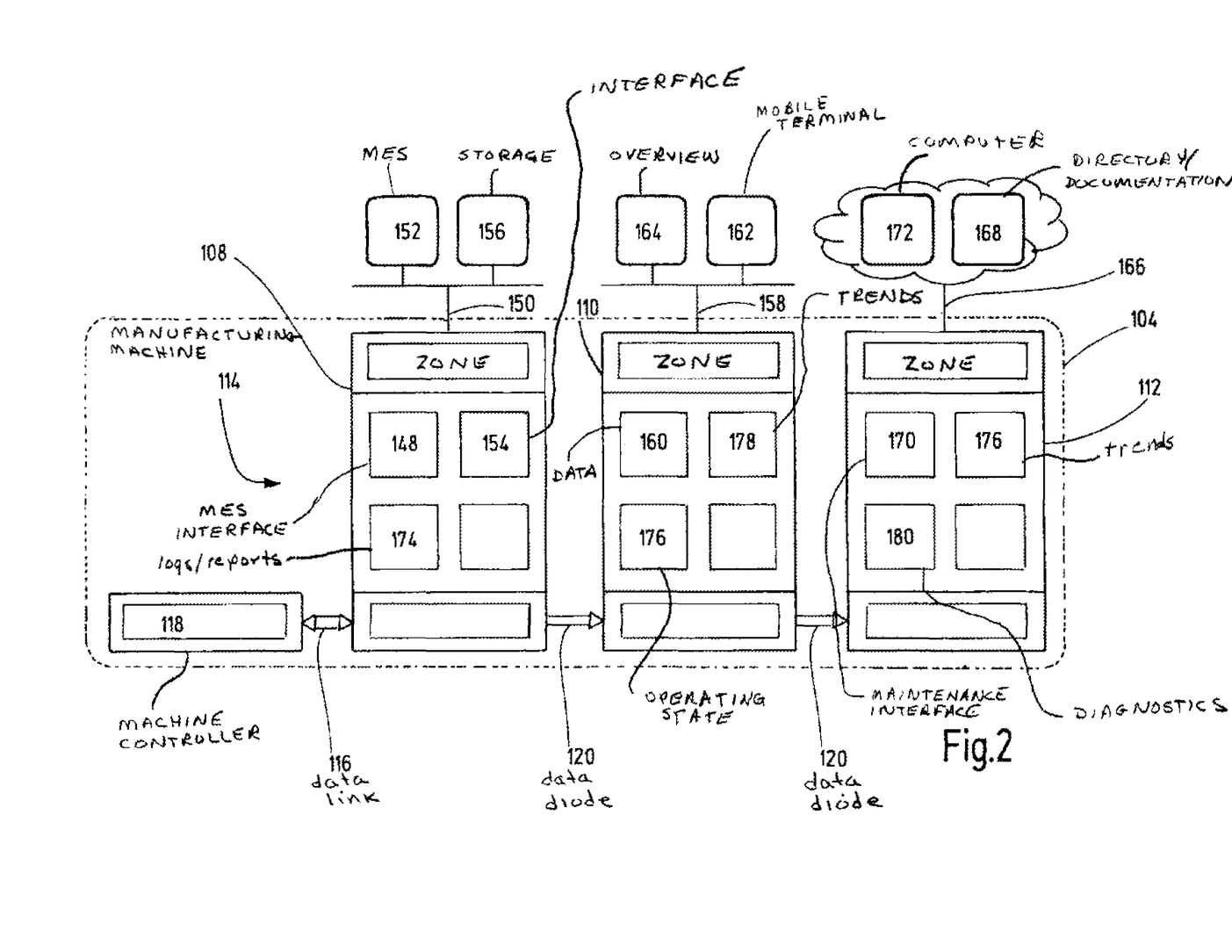
FIG. 2 is a schematic block diagram of a device for the secure data connection of at least one manufacturing machine, according to an exemplary embodiment of the invention.

FIG. 2 shows a schematic block diagram of a device according to the invention, which can be designated as a multi-zone computing platform, for connecting at least one manufacturing machine 104 to external (with respect to the manufacturing machine 104) data processing devices not shown in the figures. The manufacturing machine 104 may be manufactured and delivered in conjunction with the device as an integral part of the manufacturing machine 104, or it may be subsequently equipped with the device after the manufacturing machine 104 has been delivered.

The device according to the invention has an information-processing system 114 divided into three individual zones 108, 110, 112 (FIG. 2) in the form of computers. Every computer is independently functional in terms of its hardware and software and is formed to be separate at the hardware and software level. Particularly, each computer is spatially separated from the computers of the other zones 108, 110, 112. In addition, the computers correspond to each other in terms of their hardware and their operating software and can each be configured for use as intended in accordance with the individual zones 108, 110, 112 by application software 122, 124 (FIG. 3) (Application Software, App). The application software 122, 124 may be used, for instance, for data conversion, data processing, or data forwarding.

A first zone 108 (FIG. 2) is connected to the machine control 118 of the manufacturing machine 104 via a data link 116, in particular a bidirectional data link 116, and is used to process data transmitted by the machine control or controller 118 via the data link 116. In addition, the first zone 108 may be connected, in particular bidirectionally, to the machine control of at least one other manufacturing machine via a network. All manufacturing machines connected to the first zone 108 via the network are provided within a production plant. In addition, in the sense of a series connection, the first zone 108 is connected to a second zone 110 and the second zone 110 is connected to a third zone 112 by one unidirectional data link each, in the form of a data diode 120. The direction of the data flow of the machine control data 118 located in the first zone 108 from the first zone 108 to the second zone 110 and from the second zone 110 to the third zone 112 is predetermined. A backflow of data from the third zone 112 into the second zone 110 and/or from the second zone 110 into the first zone 108 is completely precluded. In the direction of the data flow, the zones 108, 110, 112, starting from the first zone 108 having the highest level of data security, i.e. data criticality, are arranged in a hierarchically descending manner, each have a lower level of data security than the at least one upstream zone 108, 110 with respect to the data flow, such that the last zone of the hierarchically descending series circuit, i.e., the third zone 112 in FIG. 2, has the lowest level of data security.

Every zone 108, 110, in particular a transmitting unit 128 (FIG. 3) of the respective zone 108, 110, comprises at least one configurable filter module on the output end, which provides at least one predefinable, unfiltered subset of a data quantity of the respective zones 108, 110 for transmission by the respective data diode 120 to a zone 110, 112 having a low level of data security. The filter module can be used to select which data may leave a respective zone 108, 110 and be made available to the downstream zone having the lower level of data security.

Figure 3:
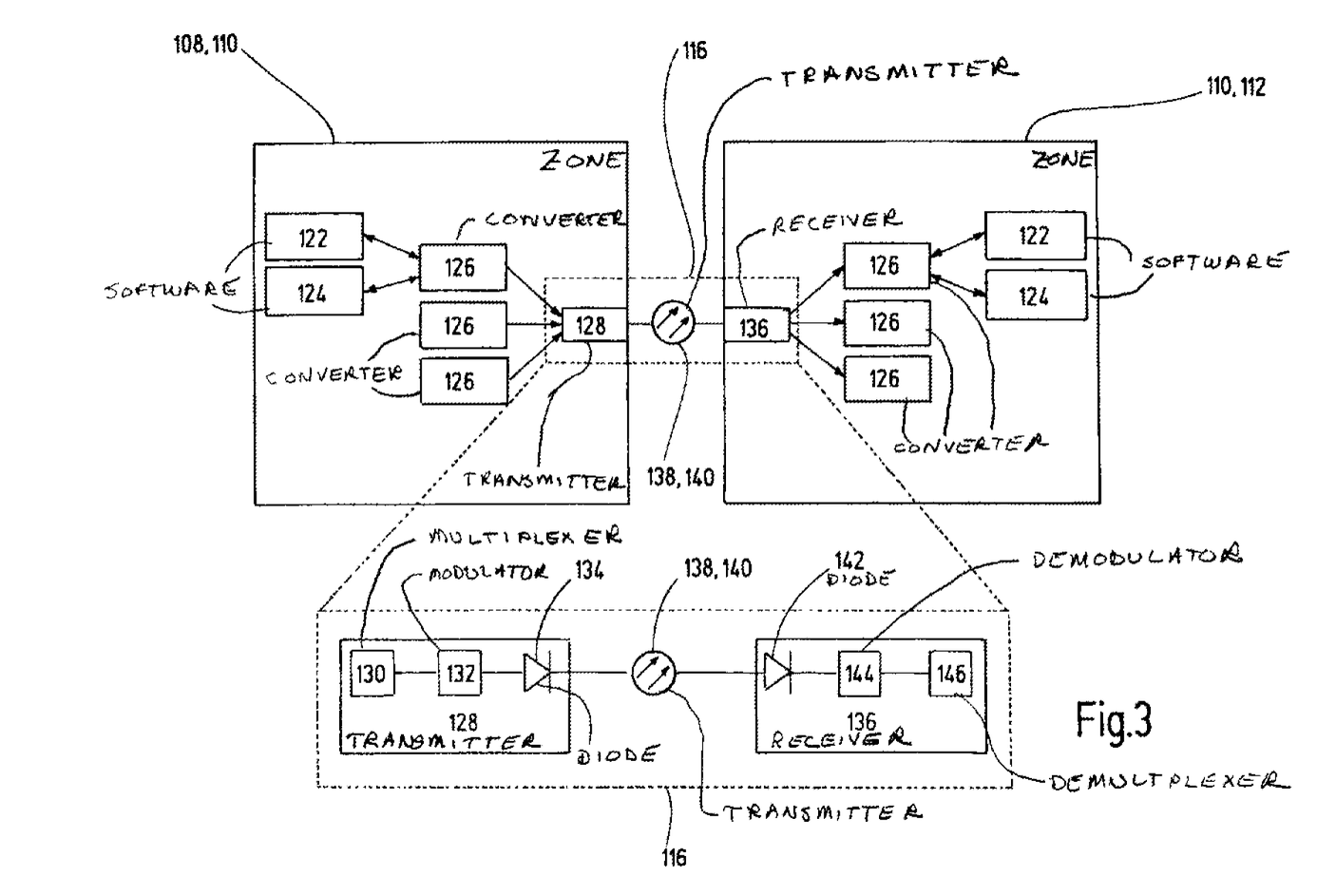
FIG. 3 is a schematic block diagram of the data flow of the device according to the exemplary embodiment of the invention of FIG. 2 from an application software implemented on one zone to an application software implemented on another zone.

FIG. 3 shows schematically in a principal block diagram the data flow from a respective zone 108, 110 to another zone 110, 112 of the device according to the invention, on each of which different types of application software 122, 124 are implemented. The data processed by respective application software 122, 124 implemented in the zone 108, 110 having the higher level of data security is first transmitted to one of a plurality of protocol converters 126 provided in this zone 108, 110, The protocol converters 126 serves for protocol conversion and coupling of a data transfer protocol that can be processed by the zone 108, 110 having the higher level of data security to a data transfer protocol that can be transmitted by the data diode 120. The protocol-converted data are transferred from the protocol converter to a transmitting unit 128, provided in the zone 108, 110 having the higher level of data security, of the data diode 120, which transmitting unit 128 has a multiplexer 130. The output end of multiplexer 130 is connected to a modulator 132 of the transmitting unit 128. The modulator 132 transfers the modulated data to a laser diode 134 included in the transmitting unit 128 to generate a light signal.

The multiplexer 130 is provided by a layer in the form of the MAC (Media Access Control) layer according to the OSI model (Open System Interconnection Model) known from the prior art. The layer may additionally comprise a data flow control system and is part of the layer in the form of the data link layer according to the OSI model. The multiplexer 130 can be used to transmit the data, provided by the protocol converters 126, in the form of corresponding different data streams via a single channel in the form of the data diode 120. The modulator 132 is provided by the layer in the form of the physical layer according to the OSI model and is used to encode the data present digitally in the zones 108, 110 having the higher level of data security, into modulated analog data that can be transmitted using the data diode 120. The laser diode is part of an Ethernet transceiver, e.g. SFP (Small Form-Factor Pluggable) or SFP+, which is used as an optical fiber network interface and whose data receiving port Rx is blocked.

The zone 110, 112 having the lower level of data security (FIG. 3) has a receiver unit 136 of the data diode 120, which is connected to the transmitting unit 128 of the zone 108, 110 having the higher level of data security by a data transmission means transmitter 138 in the form of an optical fiber cable 140 Transmitter 138 transmits the light signal comprising data and emitted from the laser diode 134 of the transmitting unit 128 to the receiver unit 136 of the data diode 120. Data diode 120 comprises a photo diode 142 for detecting the light signal. In addition, the receiver unit 136 has a demodulator 144, into which the data stream received from the photo diode 142 is input at the input end and which passes the demodulated data at the output end to a demultiplexer 146 of the receiver unit 136. Receiver unit 136 on the output end transmits the data processed thereby to at least one protocol converter 126. In each case for protocol conversion and coupling of the data transfer protocol can be transmitted by the data diode 120 to the data transfer protocol that can be processed by the zone 110, 112 having the lower level of data security. Every protocol converter 126 provides the converted data to various types of application software 122, 124 for further processing.

The photo diode 142 is part of an Ethernet transceiver (e.g. SFP or SFP+) that serves as an optical fiber network interface and whose data transmitting port is blocked. The demodulator 144 is provided by the physical layer according to the OSI model and is used to decode the modulated analog data that can be transmitted by the data diode 120 into digital data that can be processed by the zone 110, 112 having the lower level of data security. The demultiplexer 146 is provided by the MAC layer according to the OSI model and is used to separate the data streams combined by the multiplexer 130 of the transmitting unit 128.

In FIG. 2, the first zone 108 is a production zone, the second zone 110 is a monitoring zone, and the third zone 112 is a service zone.

The MES interface 148 of the production zone 108 (FIG. 2) can be connected via an company-internal (with respect to the company operating the manufacturing machine 104) manufacturing network 150, e.g. via a local area network (LAN), to a computer of the manufacturing execution system (MES) 152 of the manufacturing management system for managing the production of the product manufactured by the manufacturing machine 104 and/or the database interface 154 of the production zone can be connected via the manufacturing network 150 to a computer of a data storage device 156, on which machine data collected over a period of time, in particular a long period of time, are stored or buffered and from which they can be retrieved. The MES 152 can be used to automatically control several manufacturing machines 104 of a production plant at the same time, permitting the production process to be streamlined and human errors, such as typing errors, to be minimized. Setpoints, process values, alarms, and/or events can be stored on the data storage device 156 for long-term storage, or data can be buffered, in particular using OPC Historical Data Access (HDA), for a short time. In addition to processing data from the machine control, the production zone 108 is used to forward such data to the computer of the MES 152 and/or to the computer of the data storage device 156, and to process data transmitted from the computer of the MES 152 and/or from the computer of the data processing device 156. Data processing includes the generation of production logs 174 and reports 174.

The monitoring zone 110 (FIG. 2) can be connected via a company-internal (with respect to the company operating the manufacturing machine 104) office network 158, for instance via a further local area network (LAN) to a computer, on which a data overview 164 of data of all manufacturing machines 104 of the production plant can be generated, and/or to mobile terminals 162, for instance a tablet, a laptop and/or a smartphone. The monitoring zone 110 (FIG. 2) is used to generate a data summary 160 of the data of a manufacturing machine 104 to detect trends 178, and to record the operating state 176 of the manufacturing machine 104, each computed from data transmitted from the machine control 118 of the manufacturing machine 104 to the monitoring zone 110. Using the data summary 160, the efficiency of the manufacturing machine 104 can be monitored and less efficient components can be identified. In addition, a particularly good overview of the manufacturing machine 104 can be obtained by the data overview 160 when the key performance indicators are displayed. The browser of the terminal devices 162 can be used to access the data overview 160.

The service zone 112 (FIG. 2) can be connected via an external network 166, for instance via a wide area network (WAN), preferably via the Internet, particularly preferably using cloud computing, to a computer for creating a directory 168 and/or a documentation 168, and/or via the external network 166 by a maintenance interface 170 to a computer of the manufacturer 172 of the manufacturing machine. The directories 168 and/or documentation 168 can be located in the cloud (cloud computing) and can include lists of spare parts of the manufacturing machine 104. The documentation 168 includes technical information about the manufacturing machine 104 and its associated components, in particular the device according to the invention. The service zone 112 is used to record the operating state 176 of the manufacturing machine and/or to perform remote diagnostics 180. The machine manufacturer can provide the producer with troubleshooting assistance within the framework of remote diagnostics 180.

Example applications of the device according to the invention and its advantages are discussed in more detail below:

Remote diagnosis: By introducing a service zone 112, the machine manufacturer 172 can provide remote diagnostics 180, which does not impose any additional risk or validation burden on the producer. In this case, access by the manufacturer 172 is limited to a subset of the data from the service zone 112 by the data filter.

Machine optimization: By introducing a service zone 112 in the manufacturing machine 104, usage data of the machine 104 can be recorded and transmitted to the machine manufacturer 172. These data can be used as a basis for further developments and improvements of the machine manufacturer 172. It can be used to better adapt future machine generations to the actual usage behavior of customers.

Efficiency Data Record: The formation of different zones 108, 110, 112 permits the efficiency data to be made available on the office network 158 or a cloud service. The recording of efficiency data of production lines and machines 104, e.g. Overall Equipment Effectiveness (OEE), permits the producer to evaluate process changes and identify improvement potentials. In particular, the recording of key figures is not necessarily GMP-relevant. Thus, the key figure recording does not require write access to the production zone 108, but only to the relevant information. In this respect, the key figures can be acquired and evaluated in a separate zone 110, 112.

Scheduling maintenance: Setting up of different zones 108, 110, 112 permits runtime information to be provided, improving the scheduling of maintenance work. For instance, the scheduling of maintenance activities on a manufacturing machine 104 ideally requires data on the operating time or cycles of operation of individual components or assemblies, e.g. a valve has to be replaced after a certain number of switching cycles or a seal after a certain number of operating hours. On the one hand, the machine manufacturer 172 can use runtime information to prepare deliveries of spare parts even before the producer orders them or to inform the producer about upcoming maintenance work. On the other hand, the producer can use such information to arrange a more efficient maintenance schedule.

Predictive Maintenance: The data-supported analysis of machine data, e.g. the switching time of valves, based on different zones 108, 110, 112 can be used to estimate when a component has to be replaced. For this purpose, the device permits local processing in a non-production zone, i.e., the monitoring zone 110 or the service zone 112. Additionally, the corresponding application software 122, 124 (FIG. 3) can be coupled to external services.

Pre-validation of application software: Because of the different zones 108, 110, 112, newly installed application software 122, 124 (FIG. 3) can be run in a non-production zone, e.g. in the monitoring zone 110 or in the service zone 112, in parallel with the application software 122, 124 used. The software 122, 124 is supplied with identical production data in both zones 108, 110, 112, which can be used to check whether the newly installed application software 122, 124 provides the same results as the application software 122, 124 already implemented. In this way, tests whether the newly installed application software 122, 124 is a hazard to the integrity, safety and/or productivity of the production plant can be conducted during operation.

Production logs: The different zones 108, 110, 112 can be used to generate logs 174 (FIG. 2) and reports 174 in the monitoring zone 110 or in the service zone 112, because processing production information, e.g. the generation of production logs 174, does not require access to the production zone 108, only to machine data.

GMP Documentation: By separating the GMP-relevant and the non-GMP-relevant software 122, 124 into different zones 108, 110, 112, the scope of the required GMP documentation can be reduced to the GMP-relevant software 122, 124 in the production zone 108.

Secure connection of alarms via insecure networks 166: The device permits alarms, status messages and other information to be sent directly to end devices 162, such as tablets, laptops and/or smartphones, via, in particular, insecure networks 166, such as the Internet and/or mobile networks, without any security risk to the producer.

While one embodiment has been chosen to illustrate the invention, it will be understood by those skilled in the art that various changes and modifications can be made therein without departing from the scope of the invention as defined in the claims.

The invention claimed is:

1. A device for a secure data connection of at least one manufacturing machine having an information-processing system, the device comprising:
   subdivided individual zones interconnected by data diodes, the data diodes being capable of transferring data originating from a machine controller of the manufacturing machine in a data flow transferred to the individual zones without a data return flow, the individual zones having ordered hierarchically with each of the individual zones having a lower level of data security than a respective upstream one of the individual zones in relation to the data flow; and
   an independent computer forming each of the individual zones in a manner of an isolated application, each independent computer being independently functional relative to hardware and software thereof and being formed separate from each other independent computer at a level of the hardware and software thereof.

2. The device according to claim 1 wherein
   a first zone of the individual zones is downstream of the machine controller, functions as a production zone, processes at least machine data of the manufacturing machine and forwards the machine data to a monitoring zone of the individual zones and/or a service zone of the individual zones as the respective downstream individual zones, the respective individual zone being capable of forwarding the machine data to a company-internal, an external network or an Internet portal.

3. The device according to claim 2 wherein
   a data transmitter is connected to the production zone for the machine controller and is connected to machine controllers of other manufacturing machines within a production plant.

4. The device according to claim 2 wherein
   the production zone is capable of preforming at least one data processing operation including data processing of data of a manufacturing execution system of a manufacturing management system, data processing of data collected over a period of time, or generation of production logs and/or reports.

5. The device according to claim 2 wherein
   the monitoring zone is capable of preforming at least one data processing operation including generating a data overview of the manufacturing machine, detecting trends of the manufacturing machine or recording of operating states of the manufacturing machine.

6. The device according to claim 2 wherein
the service zone is capable of preforming at least one data processing operation including data processing of maintenance data of the manufacturing machine, recording machine operating states of the manufacturing machine or performing remote diagnostics of the manufacturing machine.

7. The device according to claim 3 wherein
the data transmitter is between the manufacturing machines of a production plant and is capable of transmitting data of manufacturing execution systems of manufacturing management system and data collected over a period of time of the manufacturing machines.

8. The device according to claim 3 wherein
the company-internal network is capable of transmitting data generating a data summary of the manufacturing machines and mobile device data.

9. The device according to claim 2 wherein
the external network, including a computer cloud is capable of transmitting, data for maintenance scheduling and/or a creation of directories and/or documentation documents and/or a link between real machine data and documentation in the computer cloud.

10. The device according to claim 1 wherein
the data diodes are between the individual zones and comprise laser diodes capable of generating light and photo diodes capable of detecting the light from the respective laser diodes.

11. The device according to claim 1 wherein
the individual zones comprise first, second and third zones, the second and third zones being at least partially interconnected in parallel to one another and being connected in series with and from the first zone with respect to the data flow.

12. The device according to claim 1 wherein
each of the individual zones comprises on an input end at least one protocol converter capable of protocol conversion and coupling of a data transfer protocol transmitted by the data diodes to a data transfer protocol processible by the individual zones and/or comprises on the output end at least one further protocol converter capable of protocol conversion and coupling of a data transfer protocol that can be processed by the individual zones to a data transfer protocol transmittable by the data diodes.

13. The device according to claim 1 wherein
the computers are formed identically with regard to the hardware and operating software there of and are configured for intended uses thereof by application software in accordance with the respective individual zone.

14. The device according to claim 1 wherein
the data diodes are formed by transmitters that are parts of the respective individual zone and receivers that are parts of the respective individual zone having a lower level of data security, data transmitters interconnect the transmitters and the receivers.

15. The device according to claim 14 wherein
each of the transmitters is formed as a transmitting data diode comprising a laser diode, a multiplexer and a modulator;
each of the receivers is formed as a receiving data diode comprising a photo diode, a demodulator and a demultiplexer; and
the respective transmitters and the respective receivers are interconnected via the respective data transmitters being optical fiber cables.

16. A manufacturing machine, comprising:
an information-processing system; and
a device forming a secure data connection to the information-processing system, the device including:
subdivided individual zones interconnected by data diodes, the data diodes being capable of transferring data originating from a machine controller of the manufacturing machine in a data flow transferred to the individual zones without a data return flow, the individual zones having ordered hierarchically with each of the individual zones having a lower level of data security than a respective upstream one of the individual zones in relation to the data flow; and
an independent computer forming each of the individual zones in a manner of an isolated application, each independent computer being independently functional relative to hardware and software thereof and being formed separate from each other independent computer at a level of the hardware and software thereof.

17. A production plant, comprising:
a plurality of manufacturing machines;
an information-processing system coupled to each of the manufacturing machines; and
a device forming a secure data connection to the information-processing system, the device including:
subdivided individual zones interconnected by data diodes, the data diodes being capable of transferring data originating from a machine controller of the manufacturing machine in a data flow transferred to the individual zones without a data return flow, the individual zones having ordered hierarchically with each of the individual zones having a lower level of data security than a respective upstream one of the individual zones in relation to the data flow; and
an independent computer forming each of the individual zones in a manner of an isolated application, each independent computer being independently functional relative to hardware and software thereof and being formed separate from each other independent computer at a level of the hardware and software thereof.

* * * * *